July 10, 1956 C. N. BEBINGER 2,753,984
TAILPIECE FOR FLEXIBLE SHAKER CONVEYORS
Filed Dec. 21, 1950 5 Sheets-Sheet 1
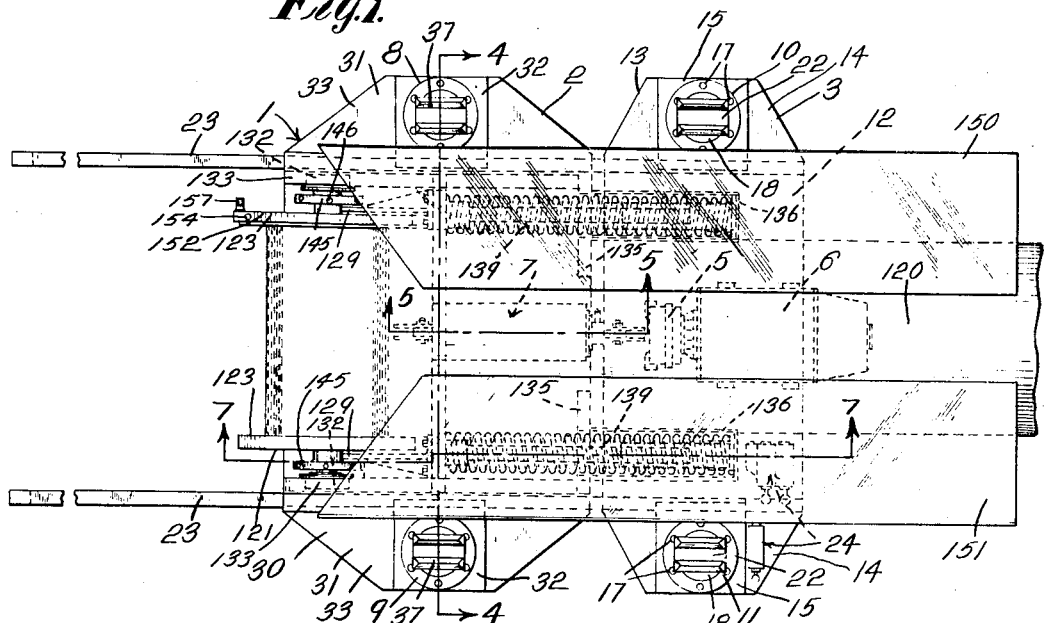
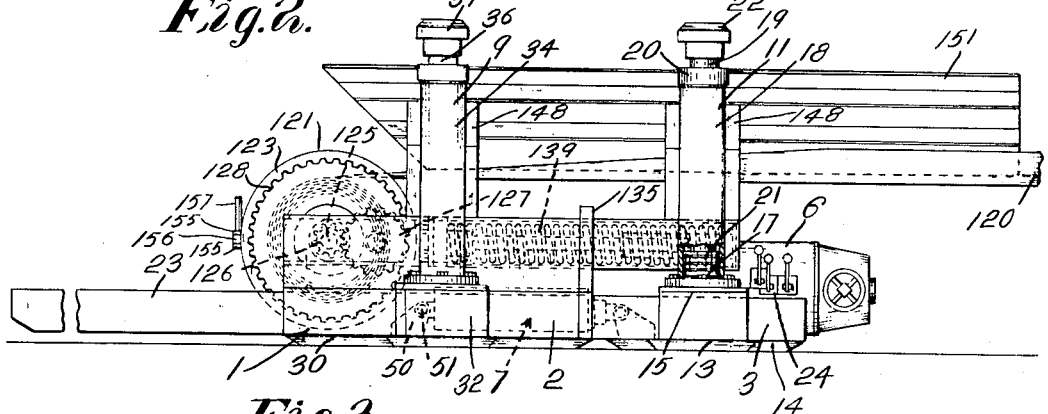
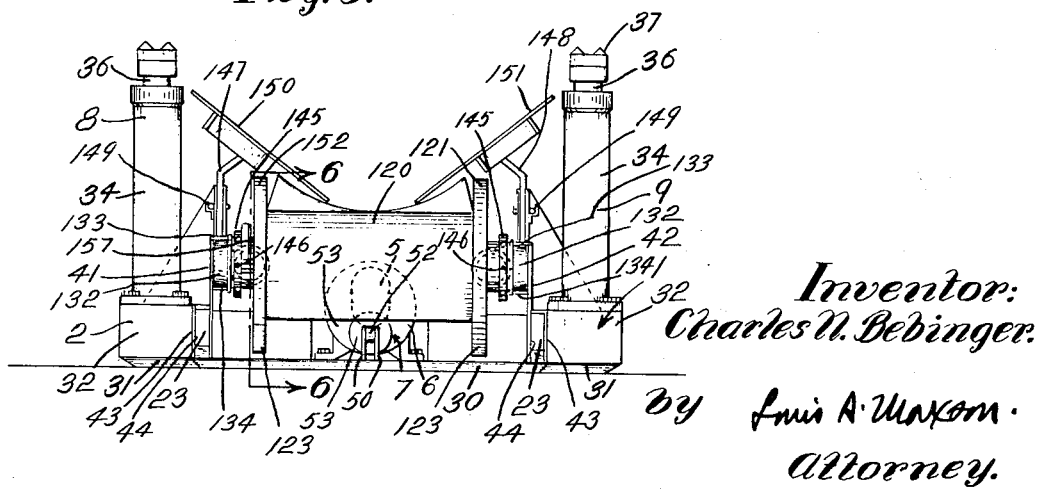
Inventor:
Charles N. Bebinger.
by Louis A. Maxson.
Attorney.

July 10, 1956　　　C. N. BEBINGER　　　2,753,984
TAILPIECE FOR FLEXIBLE SHAKER CONVEYORS
Filed Dec. 21, 1950　　　　　　　　　　　　5 Sheets-Sheet 2
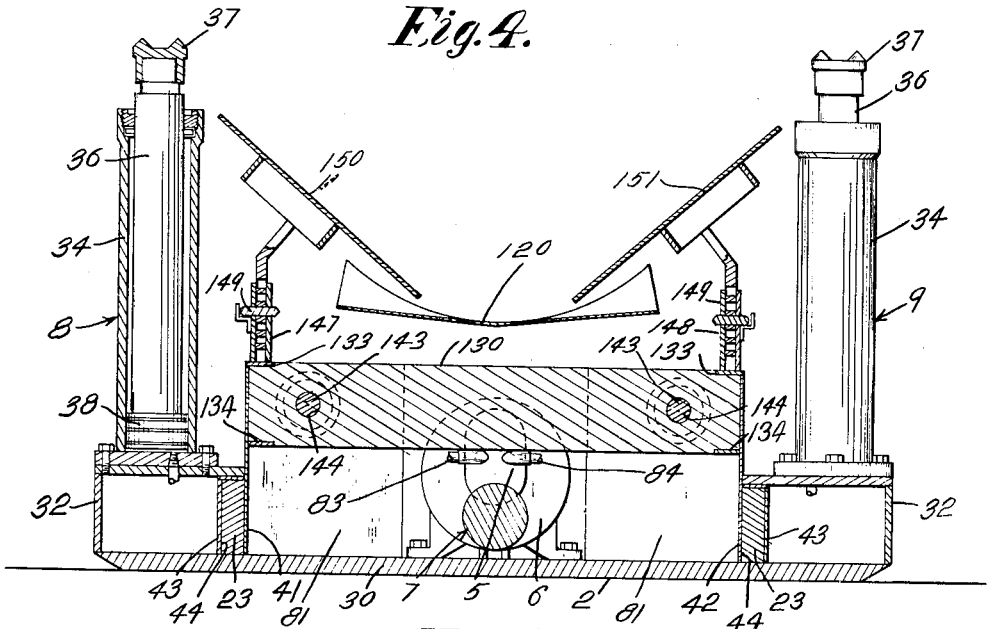
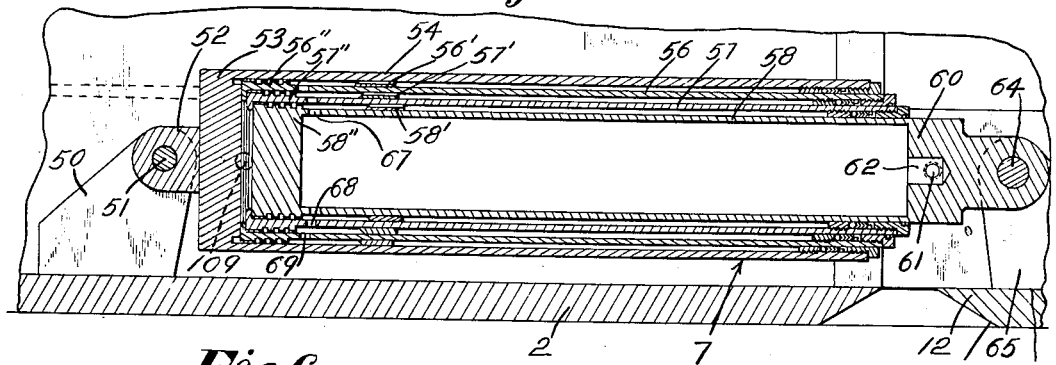
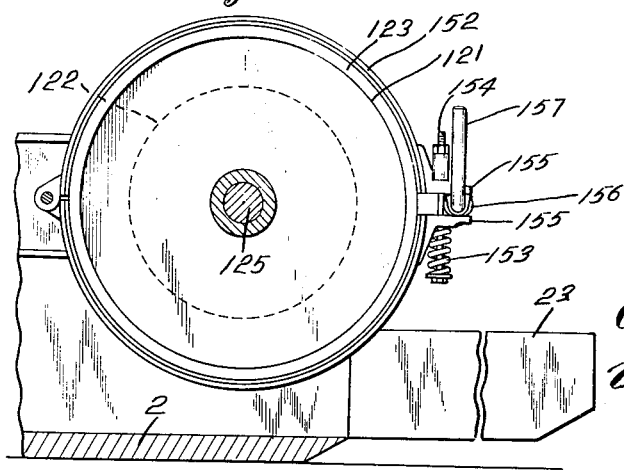
Inventor:
Charles N. Bebinger,
by
Louis A. Waxom,
Attorney.

July 10, 1956  C. N. BEBINGER  2,753,984
TAILPIECE FOR FLEXIBLE SHAKER CONVEYORS
Filed Dec. 21, 1950  5 Sheets-Sheet 3
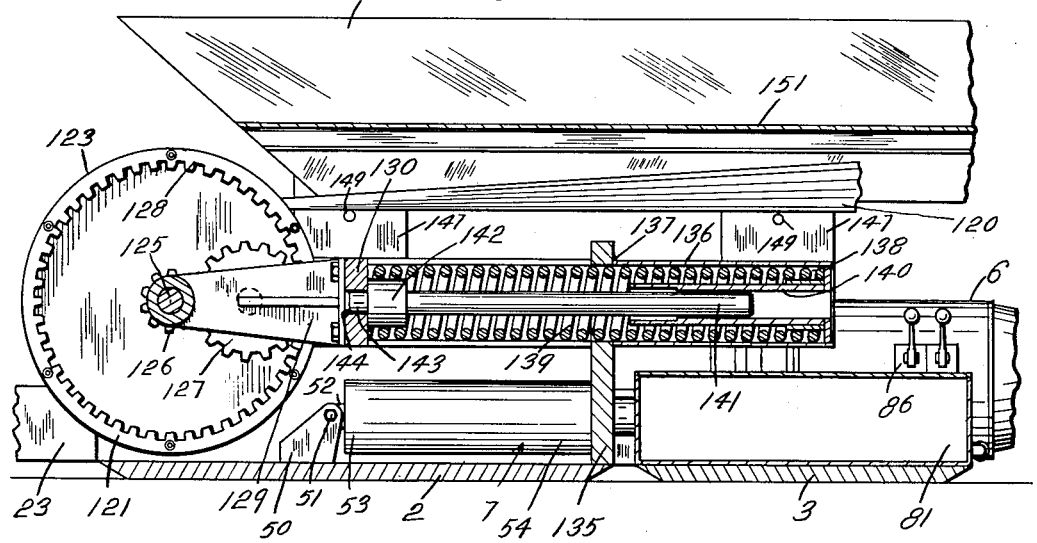
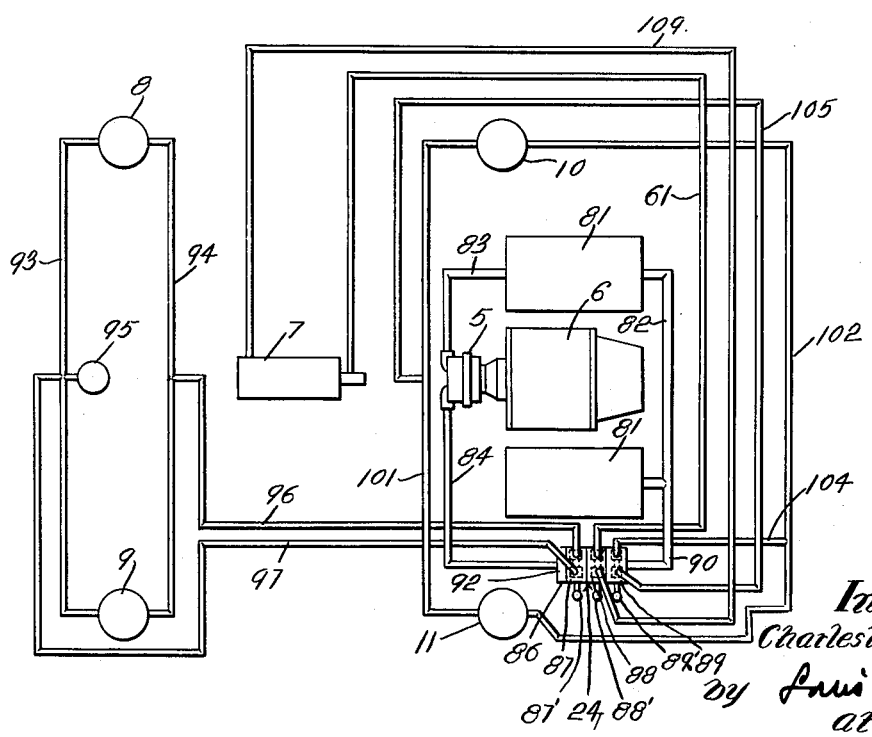
Inventor:
Charles N. Bebinger July 10, 1956  C. N. BEBINGER  2,753,984
TAILPIECE FOR FLEXIBLE SHAKER CONVEYORS
Filed Dec. 21, 1950  5 Sheets-Sheet 4
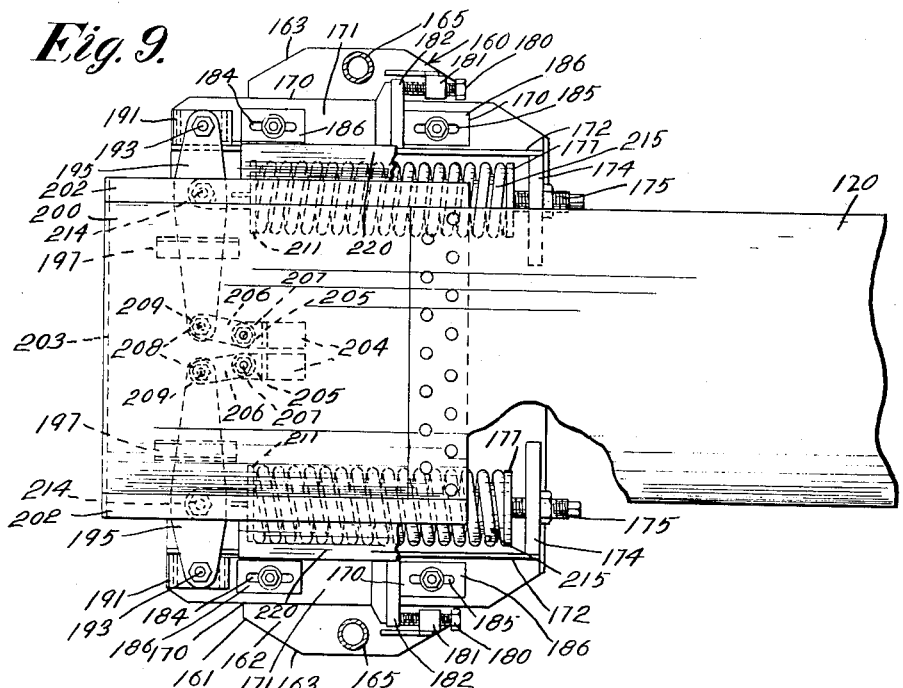
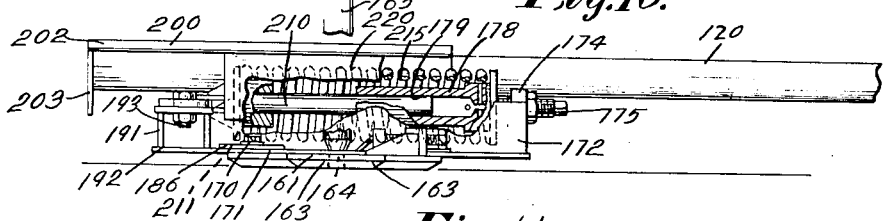
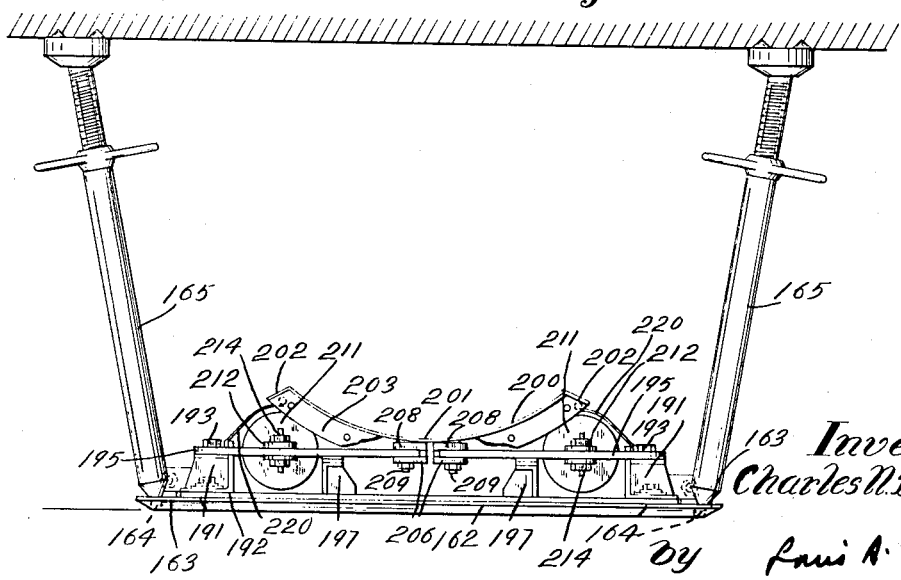
Inventor:
Charles N. Bebinger
By Louis A. Maxom
Attorney

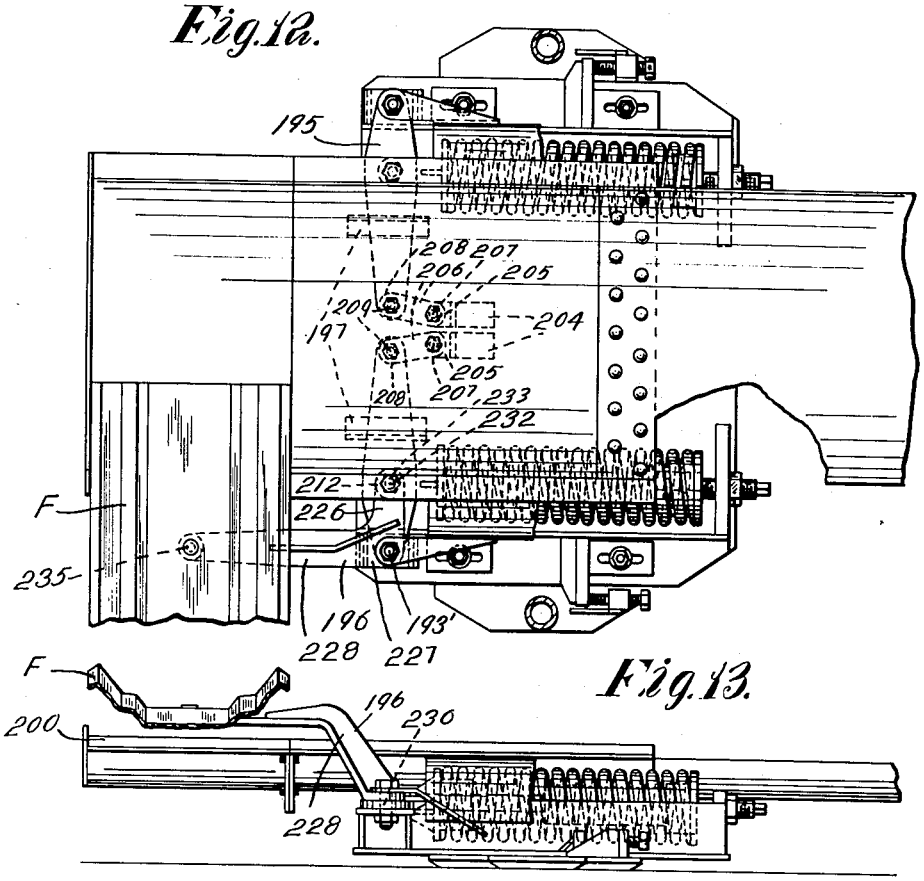

United States Patent Office 2,753,984
Patented July 10, 1956

2,753,984

TAILPIECE FOR FLEXIBLE SHAKER CONVEYORS

Charles N. Bebinger, New Philadelphia, Ohio, assignor to Joy Manufacturing Company, Pittsburgh, Pa., a corporation of Pennsylvania Application December 21, 1950, Serial No. 201,893

5 Claims. (Cl. 198—220)

The invention relates to flexible shaker conveyors and particularly to tail pieces for such conveyors.

Flexible shaker conveyors are shaker conveyors in which the conveyor element proper is a flexible steel strip of a width comparable to the width of a trough line, and which is so relatively thin and so flexible that it can be reciprocated only by the exertion of tension alternately at the opposite ends of its working length, and which may be wound on a reel and payed off of the latter to provide increments in its working length as necessary.

Flexible shaker conveyors may have the reel upon which the unextended portion of the strip is stored, disposed either at the material-receiving end of the conveyor or at the material discharge end of the conveyor. There are certain advantages to locating the driving mechanism which effects a traction upon the strip at a rate appropriate to having the material on the strip move with the strip towards the discharge, at the discharge end of the strip. These drivers, of which three are illustrated in my application, Serial No. 201,892, filed December 21, 1950, now abandoned, Driving and Motion Controlling Device for Flexible Shaker Conveyors, may be said to provide alternative traction at a desired relatively slow rate and a control for opposite strip movement permitting such opposite movement to take place at a faster rate. Because it is not practicable to push on the discharge end of the strip and thereby effect its faster movements which cause it to slide beneath the load which is resting upon it, it is necessary to provide at the other ends of the strips tail pieces which include devices which permit the strip to be drawn in the direction of material discharge at the rate established by the driving means and which provide tractive forces opposite to the tractive forces exerted by the drive means, which opposite tractive forces providing means is capable of moving the strip just as rapidly as the control function of the drive, so called, permits. Springs of suitable characteristics are illustrative of the yielding traction exerting devices which are adapted to be associated with mountings on tail pieces to permit the discharge effecting movements of a strip and to produce the opposite faster movements of the strip.

Such tail pieces may obviously have their resilient means of other types than mechanical springs. The tail pieces may have associated with them means for effecting bodily movement of the tail pieces, to follow up the source of material which the flexible conveyor, of which they form a part, conveys. They may, on the other hand, be adapted to be hauled by the device which delivers material to them, for example, a continuous miner, as the latter advances. They may support a reel on which the portion of a strip not in active use may be wound—this when the "drive" has no provision associated with it for strip storage. On the other hand, where the drive includes a reel for the portion of the strip not in use in the active conveyance of material, the tail pieces may simply include means for supporting, yieldingly exerting traction on, and guiding the material-receiving end of the strip, with or without hopper means, and in some instances the tail pieces may also include apparatus for driving conveyor devices, also of the shaker type, which constitute feeders for them.

An object of the present invention is to provide an improved tail piece for use as a part of a flexible shaker conveyor apparatus. Another object of the invention is to provide an improved tail piece for use in a flexible shaker conveyor system which has improved anchoring and feeding means associated with it. A further object of the invention is to provide an improved tail piece having an improved supporting means for the material-receiving end of a flexible conveyor strip. Still another object of the invention is to provide an improved tail piece having improved means associated therewith for actuating another shaker conveyor which serves to feed material to the conveyor system of which the tail piece forms a part. Still another object of the invention is to provide an improved tail piece having a reel for the storage and paying out of a flexible conveyor strip as need for the extension of the strip occurs. Yet a further object of the invention is to provide an improved control for a flexible strip carrying reel carried by a tail piece. Still another object of the invention is to provide an improved material hopper arrangement in association with a flexible strip wound upon a reel carried by a tail piece. Other objects and advantages of the invention will hereinafter more fully appear.

In the accompanying drawings in which two illustrative embodiments of the invention, together with a modification of one of these whereby an improved drive for a face trough or the like may be provided, are shown for purposes of illustration:

Figure 1 is a top or plan view of one form of tail piece in which certain aspects of the present invention are incorporated, parts being broken away to permit getting the view into the width of the drawing.

Figure 2 is a side elevational view of the apparatus shown in Figure 1.

Figure 3 is a view of the apparatus shown in Figures 1 and 2, looked at from the left or extreme end of the apparatus.

Figure 4 is a transverse vertical sectional view taken on the plane of the line 4—4 of Figure 1, the section being on an enlarged scale.

Figure 5 is a fragmentary section on the vertical plane of the section line 5—5 of Figure 1, the section being much enlarged.

Figure 6 is an enlarged vertical sectional view on the plane of the line 6—6 of Figure 3.

Figure 7 is an enlarged longitudinal vertical sectional view on the plane of the line 7—7 of Figure 1.

Figure 8 is a hydraulic diagram showing the parts of the fluid system of the apparatus of Figures 1 to 7.

Figures 9, 10 and 11 illustrate a modified tail piece construction in which the invention from certain of its aspects is incorporated. Figure 9 is a top plan view with parts broken away.

Figure 10 is a side elevational view, with parts broken away, of the structure shown in Figure 9.

Figure 11 is an enlarged end view, looking from the left in Figures 9 and 10, of the structure shown in those figures, parts being broken away in Figure 11 also to show details of construction.

Figures 12, 13, and 14 are views respectively corresponding to Figures 9, 10 and 11 and showing the tail piece of Figures 9, 10 and 11 with driving and supporting means for the discharge end of a feeder conveyor.

Referring now to the drawings and first to Figures 1 to 8 thereof, it is to be noted the structure illustrated is a self-feeding, self-anchoring tail piece for a flexible shaker conveyor in which the reel for the storage, paying-out and winding-in of the flexible strip which constitutes the material supporting and moving element of the conveyor, constitutes a part of the tail piece and is supported on another element of the tail piece and is reciprocable rectilinearly relative thereto.

The tail piece structure, which is generally designated 1, comprises a main frame or element 2 and a frame or element 3 which cooperates with the frame 2 in effecting feeding of the latter, and which also constitutes a support for a hydraulic pump 5 and for the driving motor 6 of said pump, said pump supplying the fluid to actuate a walking jack device 7 and roof jacks 8, 9, 10 and 11. Two of the roof jacks, 8 and 9, are mounted on the main frame 2, the others, 10 and 11, on the frame 3. It will be noted that the frame 3, as shown, comprises an elongated octagonal base plate 12 comprising a wider central portion 13, and narrower side portions 14 diminishing in width toward their extremities. The plate 12 carries on each side portion 14 a built-up piece 15 on which the jacks 10 and 11 are bolted as at 17. The jacks 10 and 11 each include a cylinder 18 containing a piston rod 19 extending upwardly through a suitable packed head 20, said piston rod carrying at its lower end a suitable piston 21. The top of the piston rod carries a roof engaging head 22 formed to firmly engage a mine roof. The base plate 12 has secured to it near its opposite sides elongated guide bars or elements 23 which cooperate with guides, later described, on the frame 2. Substantially midway between the lateral extremities of the frame 3 there is mounted the driving motor 6, herein illustrated as an electric driving motor, and this driving motor carries and actuates the pump 5 previously mentioned. A valve box arrangement 24 is mounted on the frame 3 and controls the distribution of the fluid delivered by the pump.

The frame 2 is larger than the frame 3, and it includes a wider base plate 30 having tapering ends 31, and also has pedestals or box-like elements 32 on its narrower portions 33, and these support the cylinder elements 34 of the hydraulic jack devices 8 and 9, from which piston rod elements 36 extend, these piston rod elements including heads 37 adapted to engage a mine roof, and each piston rod has secured to it a piston 38. Plate elements 41 and 42 vertically disposed at the inner sides of the pedestals 32, and L-shaped guide members 43 supported on the base plate 30 form box-like guides 44 for the guide bars 23 previously mentioned. It will be understood that when the frame 2 is stationary and the frame 3 is moved to lessen its distance from the frame 2, the guide bars 23 slide within the guides 44, while, when the frame 2 is being fed away from the frame 3, then the guide boxes slide upon the guide elements 23. By admitting fluid to extend the jacks mounted on the frame 3, this frame can be locked and the frame 2 may be shifted relative to it by the walking cylinder mechanism which I shall next describe. Correspondingly, the jacks 8 and 9 mounted on the frame 2 may hold this frame stationary while the frame 3 is shifted relative to it.

A pair of upstanding ears 50 are fixed to the frame 3 and have a pin 51 extending between them. This pin pivotally supports a boss 52 secured to the head 53 of the outer cylinder 54 of the multiple unit telescopic walking jack device 7 previously mentioned. This jack includes not only the outer cylinder 54, but two progressively smaller combined cylinder and piston elements 56 and 57 and a still smaller piston element 58 received within the cylinder and piston element 57. The piston element 58 has its piston head portion at its end nearer the head 53 and at its other end a closure member 60, which has means for effecting fluid supply to it through a conduit 61 which is connected with the interior of the piston element 58 by a bore 62. The member 60 is pivotally connected by a pin 64 to ears 65 which are secured as at 66 to the plate 12 of the member 3. It will be noted that the several elements 56, 57 and 58 each have formed thereon transversely grooved annular portions forming stops or abutments, these portions respectively numbered 56', 57' and 58', and like head portions 56'', 57'' and 58'' also formed on the members 56, 57 and 58 fit within the bores in the members which immediately surround them. Between the head portion 58'' and the annular portion 58' passages 67 extend which establish communication between the interior of the member 58 and the interior of the member 57. In like manner, similarly located passages 68 establish communication between the bore of the member 57 and the bore of the member 56, and finally, passages 69 establish communication between the bore of the member 56 and the bore of the outer cylinder 54.

The hydraulic system by which the jacks are controlled and opposite feeding movements of the tail piece are accomplished may be described before the further structure of the tail piece is taken up. The hydraulic diagram of Figure 8 shows two sumps 81, 81 connected together by a conduit 82. A conduit 83 leads from one of the sumps to the intake of the pump 5. Conduit 84 connects the discharge from the pump 5 to a multiple unit valve box structure 86. This contains three valves 87, 88 and 89, each having an operating handle, the operating handles being identified by primed numerals corresponding to those of the valves. It will be noted that in the diagram the valves 87, 88 and 89 are shown as forming the multiple unit valve box structure 86, but this is done merely for simplicity in the diagram, and one or more of the various valves may be attached to the tail piece structure as separate units as shown in Figs. 1 and 2.

The valve box structure 86 is connected by a return conduit 90 to the sumps, and the first unit 92 of the valve box structure may be provided with a pressure fluid responsive relief valve, so as to prevent the development of excessive pressures. The jacks 8 and 9 are shown connected together by conduits 93 and 94, conduit 93 leading to the bottoms of the jacks, which are of the double acting type, and the conduit 94 leading to the tops of the jack cylinders. The conduit 93 has an accumulator 95 connected to it. Conduits 96 and 97, controlled by the valve 87, lead to the conduits 94 and 93 respectively. The roof jacks 10 and 11 have their bottoms connected together by a conduit 101 and their tops by a conduit 102. These do not have accumulators connected with them, in the arrangement shown, but might have if desired. As they are not the jacks which are normally extended for a substantial period of time, accumulators are scarcely necessary. As noted, conduits 101 lead to the bottoms of the jacks 10 and 11 and conduits 102 to the tops of these jacks. Conduits 105 and 104 are controlled by the valve 89 and serve to conduct fluid to and vent fluid from the jacks 10 and 11 as may be desired. The feed or walking jack device 7 has a conduit 109 and the conduit 61 connected to its opposite ends, and these are controlled by the valve 88. Each of the valves 87, 88 and 89 is adapted, when in mid-position, to allow fluid to flow freely through it on its way to the associated line 90. In the mid-positions of the several valves they cut off communication between the conduits which they control and both the conduits 84 and 90. In the opposite positions to which the valves 87, 88 and 89 are movable from mid-position, fluid is supplied to one end of the cylinder or cylinders as the case may be which they control, and is vented from the other. It will be understood that by moving the valve 89 to a position to extend the jacks 10 and 11 and moving the valve 87 to a position to effect collapse of the jacks 8 and 9 and moving the valve 88 to a position to extend the walking jack, front frame 2 may be moved forward, that is, towards the left in Figures 1 and 2. When it has been moved forward as far as is desired, within the limit of the expansion of the movable piston and cylinder elements of the walking jack, the jacks 8 and 9 may be extended and the jacks 10 and 11 then collapsed, and the walking jack 7 be supplied with fluid under the control of valve 88 in a manner to collapse it and pull up the jacks 10 and 11 and the frame 3. The manner of moving the tail piece toward the right will be obvious to those skilled in the art, from what has been said.

Attention may now be given to the arrangements associated with the tail piece for the storage of the flexible conveyor strip thereon, for the paying out of such strip, for the delivery of material effectively to the conveyor strip, for moving the storage reel for the conveyor strip in one direction, and for permitting it to yield in the opposite direction under the traction transmitted to it by the conveyor strip. The conveyor strip is numbered 120. As it leaves the reel 121 it is, as it were, molded from its flat condition to the curvature which is imparted to it by the guide rollers (not shown) which underlie it. The reel consists of a flanged drum of which the drum or cylindrical portion 122 is indicated in dotted lines in Figure 6, and includes end flanges 123 fixed relative to the drum portion 122. The reel is rotatably mounted upon a shaft 125. The shaft 125 carries a pinion 126 which engages with a gear 127 which in turn meshes with an internal gear 128, fixed relative to one of the flanges 123. The shaft is supported in bracket elements 129 secured to a cross bar 130. The shaft supports flanged rollers or wheels 132 which are guided between upper and lower flange portions 133 and 134 mounted on the upright side plate elements 41 and 42. Another pair of laterally spaced upright frame members 135 carry tubular spring supports 136. These are suitably secured as by welding at 137 to the frame elements 135 and have an annular chamber 138 in which one end of a spring 139 is received. The inner wall of the chamber 138 is provided by a member 140 which serves as a guide for a rod 141, which has a spring centering enlargement 142 at its other end, and which is mounted at 143 in a bore 144 in the cross bar 130. It will be seen that the drum 121 can be moved to the right in Figure 7 by compressing the springs 139, and that said springs will return it, that is, move it to the left, when they are able to do so. The shaft 125 may be rotated by capstan-like elements 145 secured to it near its opposite ends, these having radial bores 146 for the reception of bars to be used in turning the shaft and thereby causing the pinion 126 to drive the gear 127 and rotate the internal gear 128 and the drum 121. It may be noted that the gear 127 is rotatably supported on one of the brackets 129. Brackets 147 and 148 are mounted on the tops of the flanges 133 and are adjustable in height as indicated at 149. These brackets support inclined material-guiding plates 150 and 151, which converge downwardly and which are spaced at their lower ends sufficiently to allow material to pass between them onto the strip 120. The drum 121 is held against rotation, except when desired, by a brake 152 of the band type, supported on one of the brackets 129 and normally applied by a spring 153 surrounding a rod 154 which extends through ear portions 155 fastened to the opposite end of the brake. A cam 156, rotatable by a hand lever 157, may be used to force the ears apart and release the brake. The cam 156 and the operating handle therefor are supported for rotation in bearings carried by one of the ears 155.

The mode of operation of this embodiment of the invention may now be briefly summarized. It has been observed that the frame 2 can be firmly held in position in a mine passage by the extension of the jack devices 8, 9. With fluid trapped in the lower ends of these jacks the accumulator 95 associated with the conduit 93 will hold the jacks firmly extended even if slight leakage of fluid occurs.

The strip 120 leads at its right hand end to a drive and motion controlling device, such as is shown in my application, Serial No. 201,892, hereinabove mentioned. Since the reel 121 is located on the tail piece a drive and control such as is shown in Figs. 14 and 15 of said abandoned application will be satisfactory. When the drive and control device pulls the conveyor strip 120 to the right in Fig. 7, the springs 139 will yield and be compressed and the wheels 132 will roll in their guides, and the reel 121 and the frame 130 and the rods 141 will all move to the right at a rate determined by the rate of movement imposed by the drive and motion controlling apparatus—the movement to the right being, as compared with the return movement, a relatively slow one. When the movement to the right is completed, and the drive and control apparatus permits a controlled, but faster, return movement to take place, the springs 139 will expand, and will force the frame 130, brackets 129, shaft 125 and the reel 121 to the left, and the strip 120 will be pulled to the left and at such a speed as to slide beneath the material upon it.

Material will be loaded onto the strip at points between the material guiding plates 150, 151 and fall onto the exposed portions of the conveyor strip. As the strip lowers with extension the plates 150, 151 may be lowered also.

When it is desired to extend the strip, it will be noted that substantial extension is possible without changing the position of the frame 3, as the multiple cylinder and piston walking jack 7 and the long guides 23 provide for extended movement of frame 2 relative to frame 3. To release the reel to permit the paying off of a desired amount of strip, the handle 157 may be operated to cause the cam 156 to spread the ears 155 apart and slacken the tension of the brake 152, but it is also possible to set the brake so that it will not slip during reciprocation of the strip, but will slip under the thrust of the walking jack, to effect the needed release of strip to permit an increase in length of the working length of the strip. Indeed, since the walking jack will advance the frame 2 but a short distance during each complete reciprocation of the strip, advance is possible during continued conveying operation.

When the extensions permitted by the length of the guides 23 and the long feed of the walking device 7 have been effected, it is, of course, possible to move up the frame 3, by collapse of the walking device 7 with the jacks 10 and 11 collapsed, and then to advance the frame 2 again. The length of the plates 150, 151 permits material to be fed to the strip 120 over a substantial length of the latter.

In Figs. 9, 10 and 11 a modified tail piece 160 is shown, this being adapted for use when the strip-storing reel is located at the discharge end of the strip. This particular tail piece is suited for use when there is an apparatus, such as a continuous miner, delivering material to the tail piece and connectible with it to advance it, and extend the strip, when this is called for. A like tail piece may be used, as shown in Figs. 12, 13 and 14, to actuate a face conveyor which delivers material to the material-receiving element of the tail piece proper.

Referring first to Figs. 9, 10 and 11, there will be noted at 161 a skid-like base plate 162, relatively wide from side to side and narrow from end to end and having tapered end portions 163 each provided with a socket 164 for a roof jack 165 to rest in it.

Upon the base plate 162, at either side of the latter, and inwardly of the jack sockets 164, there are disposed slidably adjustable frame elements 170. These are generally L-shaped in cross section, including a flat bottom portion 171 and an upright portion 172 at the inner edge of the bottom portion. Each has fixed to it at its end nearer the discharge of the conveyor strip an upright inwardly extending plate portion 174 which carries an adjusting screw 175 having a lock nut 176 associated with it, said screw 175 secured to a circular plate element 177 which at its other side carries a tubular spring guide and centering element 178 having a bore 179 extending axially of it. To adjust the frame elements 170 there are provided lock nut equipped adjusting screws 180 mounted in internally threaded supports 181 fixed to the base plate 162 and engaging outwardly extending rugged plate portions 182 fixed to the bottom portions 171 and the upright portions 172 of the frame elements 170. To permit their adjustment there are provided longitudinally spaced slots 184 and 185 in each of the bottom portions 171, and similarly slotted reinforcing plates 186 are fixed to the bottom portions 171. Clamping studs 188 and nuts 189 are associated with the slots, and the studs are mounted on the base plate 162 and extend through the slots 184 and 185 and have washers 190 on them between the nuts 189 and the reinforcing plates 186.

At the forward ends of the adjustable frame elements 170 there are built up pedestals 191 rigidly secured at their bottoms and by gusset plates 192 to the elements 170. These pedestals have pivot pins 193 mounted on them at their tops, and these are adapted to provide pivotal supports for straight arms 195 in the structures of Figs. 9 to 11 and for bell cranks 196, in the structures of Figs. 12 to 14, in addition to the arms.

The arms 195 are adapted to rest upon supports 197 mounted upon the base plate 162, and to be swingable relative to said supports and to be maintained horizontal by them.

A material receiving pan 200, arcuate in cross section as shown at 201 and with down turned stiffening flanges 202 at its opposite side edges, and with an arcuate reinforcing end flange 203, is arranged above the base plate 162 and is adapted to receive material from a continuous miner or any other source. It has secured to its bottom, more or less midway between its ends in the construction shown, a pair of pads 204 arranged alongside of each other and having forks 205 at their ends nearer the flange 203 and each pivotally receiving in the fork space thereof one end of a link element 206, pivot bolts 207 pivotally connecting the links to the forks. The other ends of the link elements 206 have forks 208 and extending through these forks and the mutually adjacent ends of the arms 195 are pivot elements 209. It will thus be noted that the arms 195 are supported on relatively fixed pivots at their outer ends, and guided for swing on such pivots by the supports 197 and that, since their inner ends are connected as described to the bottom of the pan 200, the latter is supported from beneath, and will be reciprocated if the arms 195 oscillate appropriately together.

Each of the bores 179 receives in it one end of a generally cylindrical bar 210. These bars, at their other ends, carry circular plates 211 similar in shape and size to the plate elements 177, and beyond the plates 211 there are provided forks 212 which bracket the widest portion of the arms 195 and are pivotally connected to them by the pivot pins 214. Between the plate elements 177 and the plates 211 are heavy helical springs 215, these surrounding the tubular spring support elements 178 and the bars 210. It will be evident that the compression of the springs can be varied by adjusting the plate elements 177 and that the position of the pan 200 and its supporting system can be adjusted relative to the base plate 162 by adjusting the screws 180.

Spring covers 220 are carried by the upright plate portions 172 and extend inwardly to a point beneath the side flanges on the material-receiving pan.

Turning briefly to the embodiment of Figs. 12, 13 and 14, it will be observed that the arms 195 may have superimposed on them and connected to them for swing thereby, bell crank elements 196 previously mentioned. These each include a short horizontal lower arm 226, an elbow portion 227, and an upwardly and then horizontally extending arm portion 228 whose projection on a horizontal plane makes a right angle with the arm 226. An elongated pivot pin 193' extends through both the arm 195 which turns about it, and also through a pivot opening 230 formed in the elbow of the bell crank. And a bolt and nut 232, 233 secure the short bell crank arm to the upper side of the fork 212 which is associated with the arm 195 which is connected with that fork. Thus the bell cranks swing with the arms 195, and their outer upper ends may be pivotally connected as at 235 to, and support, a face trough F in position to discharge onto the receiving plate 200.

The conveyor strip is suitably connected, as by appropriately spaced rivets to the discharge edge of the receiving plate 200.

The arrangements of Figs. 9 to 11 and Figs. 12 to 14 call for but little description of their operation. Should it be found that the right tensioning of the springs is not provided with the jacks 165 set and the amount of strip extended, the spring mountings and the pan 200, and accordingly the "free" end of the strip, can be adjusted by adjusting the frame 172 by the means described for this purpose. And, while the pan 200 is provided with underlying support only at one transverse zone, it will be evident that the guiding and supporting means for the strip 120 will contribute to maintaining the material-receiving portion of the apparatus in properly supported relation. Obviously, the bell crank added to the apparatus of Figs. 9 to 11 enables the same basic apparatus to function as a tail piece both with a frequently advancing source of material, and with a less frequently shifted supply, such as the face conveyor F.

While there are in this application specifically described two forms and a modification which the invention may assume in practice, it will be understood that these forms and modification of the same are shown for purposes of illustration and that the invention may be further modified and embodied in various other forms without departing from its spirit or the scope of the appended claims.

What I claim as new and desire to secure by Letters Patent is:

1. In combination, in a tail piece for a flexible shaker conveyor, a base, a trough element overlying said base and adapted for connection to an end of a flexible conveyor strip, and means for supporting said trough element on said base for reciprocation longitudinally of itself and of said base and for yieldingly pressing it, in the direction opposite that in which said strip extends from said trough element, longitudinally of said base including springs adjacent the opposite sides of said base, adjustable abutments on said base for said springs, arms pivotally connected to said base on upright axes, connections between each of said arms and said trough element, and means for transmitting the thrust of each of said springs to one of said arms.

2. In combination, in a tail piece for a flexible shaker conveyor, a base, a trough element overlying said base and adapted for connection to an end of a flexible conveyor strip, and means for supporting said trough element on said base for reciprocation longitudinally of itself and of said base and for yieldingly pressing it, in the direction opposite that in which said strip extends from said trough element, longitudinally of said base including springs at opposite sides of the longitudinal center line of said base, abutments on said base for said springs, arms pivotally connected to said base on upright axes, connections between each of said arms and said trough element adjacent the longitudinal center line of the latter, and means for transmitting the thrust of each of said springs to one of said arms.

3. In combination, in a tail piece for a flexible shaker conveyor, a base, a trough element overlying said base and adapted for connection to an end of a flexible conveyor strip, and means for supporting said trough element on said base for reciprocation longitudinally of itself and of said base and for yieldingly pressing it, in the direction opposite that in which said strip extends from said trough element, longitudinally of said base including springs at opposite sides of the longitudinal center line of said base, adjustable abutments on said base for said springs, transverse arms pivotally connected at their outer ends to said base on upright axes, pivotal connections between the other end of each of said arms and said trough element, and means for transmitting the thrust of each of said springs to one of said arms at a point between the pivotal connections at the opposite ends thereof.

4. The combination of claim 3, in which said springs, spring abutments, arms and trough element are mounted for bodily adjustment longitudinally of said base.

5. The combination of claim 2, in which a bell crank element has the elbow thereof pivotally connected to said base on an axis in the same straight line with one of said upright axes, has one arm thereof secured to one of said first mentioned arms and has the other arm thereof provided with an attachment for an element to be actuated by said bell crank element.

References Cited in the file of this patent

UNITED STATES PATENTS

| 2,341,074 | Bergmann | Feb. 8, 1944 |
| 2,358,876 | Overstrom | Sept. 26, 1944 |

FOREIGN PATENTS

| 338,023 | Germany | June 11, 1921 |
| 280,290 | Great Britain | Nov. 14, 1927 |
| 492,525 | Great Britain | Sept. 19, 1938 |
| 622,674 | Great Britain | May 5, 1949 |